(12) United States Patent
Illner et al.

(10) Patent No.: US 12,135,366 B2
(45) Date of Patent: Nov. 5, 2024

(54) ACTIVE PROTECTION SYSTEM AND METHOD OF OPERATING ACTIVE PROTECTION SYSTEMS

(71) Applicant: HENSOLDT SENSORS GMBH, Taufkirchen (DE)

(72) Inventors: Uwe Illner, Oberkochen (DE); Jan Erbe, Aalen (DE); Martin Welzenbach, Aalen (DE); Oliver Römpp, Aalen (DE); Oliver Rudow, Hohenbrunn (DE); Franck Friedlander, Munich (DE); Felix Blume, Neubiberg (DE); Carlos Martini, Vierkirchen (DE)

(73) Assignee: HENSOLDT SENSORS GmbH, Taufkirchen (DE)

( * ) Notice: Subject to any disclaimer, the term of this patent is extended or adjusted under 35 U.S.C. 154(b) by 436 days.

(21) Appl. No.: 17/490,217

(22) Filed: Sep. 30, 2021

(65) Prior Publication Data
US 2022/0207974 A1   Jun. 30, 2022

(30) Foreign Application Priority Data

Oct. 1, 2020  (EP) .................................. 20199573

(51) Int. Cl.
*G01S 13/86* (2006.01)
*F41H 11/02* (2006.01)
*G06V 10/25* (2022.01)
*G06V 20/52* (2022.01)

(52) U.S. Cl.
CPC ............ *G01S 13/867* (2013.01); *F41H 11/02* (2013.01); *G06V 10/25* (2022.01); *G06V 20/52* (2022.01)

(58) Field of Classification Search
None
See application file for complete search history.

(56) References Cited

U.S. PATENT DOCUMENTS

| | | | |
|---|---|---|---|
| 10,054,403 B2 * | 8/2018 | Backström | F41H 11/00 |
| 2008/0186255 A1 * | 8/2008 | Cohen | G06F 3/0321 |
| | | | 345/179 |
| 2012/0217301 A1 * | 8/2012 | Namey | F41G 3/04 |
| | | | 235/411 |
| 2017/0329202 A1 * | 11/2017 | Haeri | G02F 1/0338 |

(Continued)

OTHER PUBLICATIONS

Extended European Search Report dated Mar. 24, 2021 in related/corresponding EP Application No. 20199573.5.

*Primary Examiner* — Ladimir Magloire
*Assistant Examiner* — Brandon James Henson
(74) *Attorney, Agent, or Firm* — PATENT PORTFOLIO BUILDERS PLLC

(57) ABSTRACT

An active protection system includes a surveillance camera unit, a detection and countermeasure unit, and a central processing unit. The surveillance camera unit is configured to provide an all-round view and image data of a region of interest. The detection and countermeasure unit is configured to detect a potential threat and, upon a confirmation, to activate a countermeasure suitable to at least mitigate the threat. The central processing unit is configured to confirm the detected potential threat based on the image data of the surveillance camera unit and to provide data indicating the confirmed treat.

11 Claims, 4 Drawing Sheets

(56) References Cited

U.S. PATENT DOCUMENTS

2018/0025621 A1* 1/2018 Huang .................. G06V 20/52
                                                        348/143
2018/0247505 A1   8/2018 Arai et al.
2018/0272992 A1*  9/2018 Gage ..................... G06V 10/82
2020/0326163 A1* 10/2020 Moore .................. H04N 7/185

* cited by examiner

ACTIVE PROTECTION SYSTEM AND METHOD OF OPERATING ACTIVE PROTECTION SYSTEMS

CROSS-REFERENCE TO RELATED APPLICATION

This invention claims priority under 35 U.S.C. § 119 to European Patent Application No. 20 199 573.5, filed Oct. 1, 2020, the entire disclosure of which is herein expressly incorporated by reference.

FIELD OF THE INVENTION

The present invention relates to an active protection system and a method for operating the active protection system. In particular, an integration of an active protection system into a surveillance and command and control system is provided that reduces a false alarm rate.

BACKGROUND

Conventional active protection system (APS) are available for land, airborne, or naval applications on land vehicles, aircraft, helicopters or ships, which may be used to neutralize threats. For example, guided missiles represent a threat for all kind of vehicles. Other threats may come from surface-to-air missiles such as man-portable air-defense systems or systems with a sighting optic. The corresponding target acquisition constitutes a threat, which is to be prevented by countermeasures as far as possible.

To achieve this, the active protection systems may include the following components:
  warning sensors for detecting a potential threat;
  eventually a threat confirmation unit and fine tracking sensors to track the threat;
  countermeasure unit (e.g., a jammer or a hard-kill device);
  one or more central processing units.

An APS needs very effective warning sensors providing a very high declaration rate in order not to overlook a potential threat. At the same time, however, the false alarm rate shall be very low in order (i) to keep the crew workload low, (ii) not to waste consumable countermeasures, (iii) not to highlight the own position by activating countermeasures, and (iv) not to run out of consumable countermeasure. Conventional active protection systems still have a high false alarm rate and barely meet these needs.

The conventional APS is built up from the own sensor systems providing full or half hemispherical protection, central computers and effectors and offer own threat displays with human-machine interface, HMI, for mode selection (automatic, semi-automatic and manual) and manual countermeasure activation. Moreover, they have the own command and control devices and a threat display. In addition, the confirmation and tracking sensors of the conventional APS are active radar-based sensors for a threat detection and confirmation. These active sensors represent a problem because they are detectable from great distances.

Finally, the conventional active protection systems include countermeasures that are integrated separately on the platform. However, these countermeasures would need a 360° view in azimuth and a high angular coverage in elevation that is free from any obstacles. Therefore, there is a competition for the best integration location of the various systems. Hence, another problem of the conventional system is to find an appropriate location of the countermeasure effectors to ensure that they can operate in any direction and have a most attractive installation location.

Therefore, there is a demand for improving the active protection system to overcome at least some of the mentioned problems.

SUMMARY OF THE INVENTION

The present invention relates to an active protection system with a surveillance camera unit, a detection and countermeasure unit, and a central processing unit. The surveillance camera unit is configured to provide an all-around view and image data of a region of interest. The detection and countermeasure unit is configured to detect a potential threat and, upon a confirmation, to activate a countermeasure suitable to at least mitigate or neutralize the threat. The central processing unit is configured to confirm the detected potential threat based on the image data of the surveillance camera unit and to provide data indicating the confirmed threat.

Optionally, the central processing unit includes an image processing module being configured to provide at least one of the following: an object recognition for identifying objects in the images provided by the surveillance camera unit, and a synthetic image overlaying images of the region of interest together with symbols for identified objects as an augmented reality representation.

Optionally, the system further comprises a human-machine interface, HMI. The HMI may include a display device to display images of the region of interest together with the graphical symbols for identified objects as an augmented reality superimposed image.

Optionally, the HMI further comprises inputs to control the surveillance camera unit and/or the detection and countermeasure unit. The HMI may represent a common interface to visualize both: images obtained from the surveillance camera system and objects detected by the detection and countermeasure unit.

Optionally, the central processing unit includes a control module for controlling the detection and countermeasure unit. The control module may be configured for at least one of the following:
  to provide a threat information associated with the detected potential threat,
  to select and/or to activate an appropriate countermeasure,
  to provide information to other platforms in a vicinity of the active protection system.

Optionally, an alarm or an alert may be provided for the user, which may be optical, visual, acoustical, haptic etc.

Optionally, the detection and countermeasure unit includes one or more sensors and/or one or more countermeasure devices. The one or more sensors may include at least one of the following: a missile warner, a laser warner, a radar warner, a hostile fire indicator, a radiation sensor for at least an ultraviolet spectral range, a tracking sensor adapted to track a trajectory of a flying object or to capture changes in time for the detected threat (e.g., in the characteristic of the signal such as brightness fluctuations). The one or more countermeasure may device include, as countermeasure, at least one of the following: a laser dazzler, a smoke dispenser, a vehicle hard-kill device.

Optionally, the surveillance camera unit includes four camera modules for a 360° view. Each or at least one of the camera modules may be configured to cover at least one of the following spectral ranges:
  visual range, VIS,
  near infrared, NIR, short wave infrared, SWIR,
mid infrared, MIR,
long wave infrared, LWIR.

Optionally, the image processing module and the control module are integrated into one unit sharing the same hardware. They may be accommodated with one housing and may functionally not separable (i.e., not aggregated), but integrated. For example, they may share a common central processing unit. Likewise, the HMI may provide a common display (e.g., only one) for both functions: the surveillance and the provision of a countermeasure.

Optionally, the central processing unit is configured to provide one or more of the following steps:
  to receive, by the control module, sensor data from the one or more sensors,
  to detect, by the control module, a potential threat in the sensor data,
  to determine, by the control module, an elevation and azimuth for the detected potential threat,
  to send a threat alarm including the determined elevation and azimuth to the image processing module,
  to receive, by the image processing module, image data from the surveillance camera unit for a region around the determined elevation and azimuth of the potential threat,
  to detect, by the image processing module, the threat in the received image data and, based thereon, to send a confirmation of the threat to the control module,
  to update and/or increase resolution of the Angle of Arrival (AoA) of mentioned threat,
  to select, by the control module, at least one countermeasure,
  to activate, by the control module, the selected countermeasure(s) automatically or upon a manual activation.

Optionally, the surveillance camera unit includes further optical counter measure devices, such as laser or LED devices that are employable as soft-kill countermeasures. They may use the available optics or other components that are already present. This integration may be performed into the commander view to enhance the SWaP (size, weight and power) architecture of the overall protection and surveillance system.

Embodiments relate also to a method for operating an active protection system. The method comprises the steps of:
  providing, by a surveillance camera unit, an all-round view and image data of a region of interest;
  detecting, by a detection and countermeasure unit, a potential threat;
  confirming, by a central processing unit, the detected potential threat based on the image data of the surveillance camera unit;
  activating, upon a confirmation, a countermeasure suitable to at least mitigate the threat; and
  providing data indicating the confirmed-treat threat.

Optionally, upon the detection or the confirmation, an update and/or increase of the resolution of the angle of arrival (AoA) can be performed.

It is understood that all functions described in conjunction with the system can be implemented as further optional method steps.

Embodiments solve at least some of the aforementioned problems by integrating the APS into a surveillance and a command and control, C2, system, which provides the following synergistic effects:
  (a) Modern surveillance systems are based on a variety of high-resolution cameras covering different spectral ranges such as VIS, NIR, SWIR, MIR and LWIR. These systems providing a synthetic all-round view through intelligent superimposition of images of different spectral ranges. Moreover, the cameras offer high dynamic ranges and high frame rates to provide high contrast with different image backgrounds (day vision, night vision), even when very bright objects are displayed.
  (b) These modern surveillance and C2-systems provide situational awareness information adapted to the needs and perceptiveness of crew members.
  (c) These systems offer platform interoperability to generate a superordinate situation threat picture. The interoperability of the active protection platform allows, for example, a management via the surveillance and control system.

Thus, a passive threat confirmation is made possible by the surveillance camera system to reduce the false alarm rate of the active protection system, as well as for the countermeasure cue and activation of the active protection system.

Embodiments achieve a higher system integration of the active protection system and, therefore, a reduction of SWaP of the combined system. The higher system integration is achieved, e.g., by integrating the directed laser and/or light-emitting diodes of the countermeasure devices of the active protection system into a commander sight. Advantageously, the surveillance system can take over the threat display and the command and control of the active protection system.

BRIEF DESCRIPTION OF THE DRAWINGS

Various embodiments of the present invention will be described in the following by way of examples only, and with respect to the accompanying drawings, in which.

DETAILED DESCRIPTION

Various examples will now be described more fully with reference to the accompanying drawings in which some examples are illustrated.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
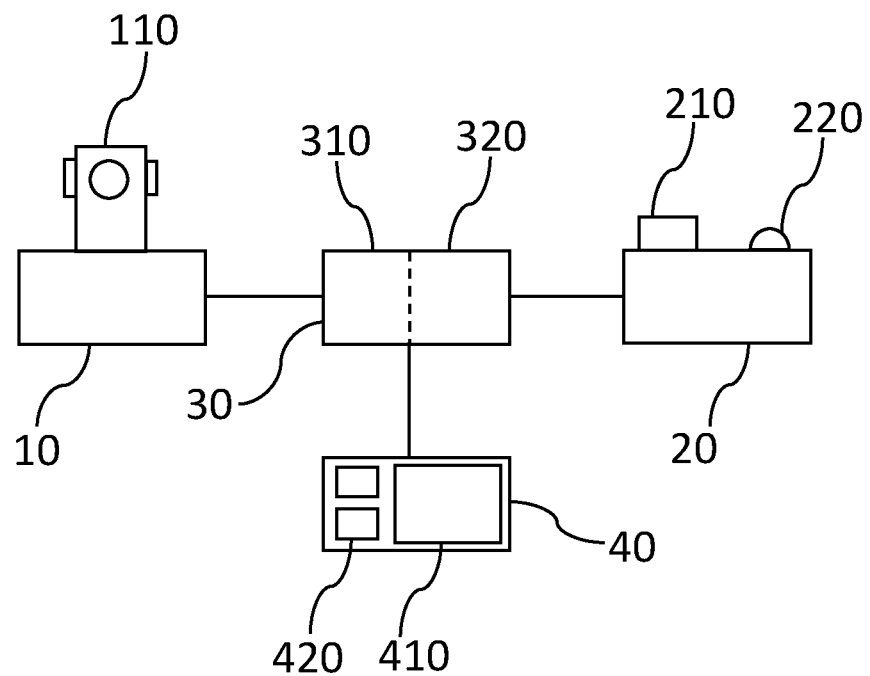
FIG. 1 depicts an active protection system according to an embodiment.

FIG. 1 depicts an active protection system according to an embodiment, which comprises a surveillance camera unit 10, a detection and countermeasure unit 20, and a central processing unit 30. The surveillance camera unit 10 is configured to provide an all-round view and to provide image data of a region of interest. The detection and countermeasure unit 20 is configured to detect a potential threat and, upon a confirmation, to activate a countermeasure suitable to at least mitigate or neutralize the threat. The central processing unit 30 is configured to confirm the detected potential threat based on the image data of the surveillance camera unit 10 and to provide information indicating the confirmed threat.

The active protection system further includes a human machine interface 40 with a display device 410 and one or more inputs 420 (e.g., as an operational panel). The display device 410 is controlled by the central processing unit 30 to depict images captured by the surveillance camera unit 10 with an optional overlay of detected objects or graphical symbols for the detected objects. The scenery can thus be visualized as an augmented reality image with highlighted threats. Thus, a visual image for the potential threat detected by the detection and countermeasure unit 20 can be highlighted to the user. The inputs 420 are configured to provide a control for the surveillance camera unit 10 and/or for the countermeasure unit 20.

According to further embodiments, the human machine interface 40 and the display device 410 are configured as a single interface for the user for both the surveillance camera unit 10 and the countermeasure unit 20. Likewise, the central processing unit 30 may represent an integrated device with various hardware components such as processors, memories and storage devices, which are configured to control not only the surveillance camera unit 10, but also the detection and countermeasure unit 20 so that both units can be controlled by a single control and processing unit 30. An optional command and control system may be integrated into the central processing unit 30 as well.

The countermeasure unit 20 includes one or more sensors 210 and one or more countermeasure devices 220. The one or more sensors 210 are configured to detect potential threats in the surrounding of the active protection system. In addition, corresponding warning sensor and/or (fine) tracking sensors can be provided not only to detect but also to track a potential threat yielding an additional threat confirmation based on a trajectory and/or the characteristics of the detected potential threat (a changing intensity can indicate a gun fire or a missile launch).

Upon a confirmation, an activation signal may be issued to engage one or more of the countermeasure devices 220. Optionally, the countermeasure devices 220 include devices of different kinds to neutralize or at least to mitigate the threat detected by the sensors 210 in an adaptive way.

The central processing unit 30 may include an image processing module 310 and a control module 320, wherein the image processing module 310 is configured to receive images captured by the surveillance camera unit 10 and to provide image processing, which may include an object recognition to verify objects (e.g., tanks, launch pads, aircrafts, helicopters etc.) detected by the detection and countermeasure unit 20. The control module 320 is configured to control the detection and countermeasure unit 20 and to receive an indication of a potential threat detected by the sensor(s) 210. The control module 320 is further configured to initiate or to trigger different kinds of countermeasures. A particular advantage of the system integration is that both the surveillance camera unit 10 and the detection and countermeasure unit 20 can be placed at positions most suitable for their respective operation. There is no competition for a best place on a vehicle, for example.

According to embodiments, the surveillance camera unit 10 is configured to provide a surround view around the position of the active protection system. For this, the surveillance camera unit 10 may include four camera modules 110, wherein each of the camera modules 110 may include different kinds of optical devices, such as cameras or sensors to capture images in the visible spectral range, but also in one or more of the infrared spectral ranges. Furthermore, the surveillance camera unit 10 provides a day and/or night vision device that allows a user to obtain visual images over day and night. The cameras modules 110 are, in particular, cameras with a high resolution to enable object detection even for distant objects in the images captured by the camera modules 110. For example, the camera modules 110 are configured to provide detailed images even for distances of 300 m or even of kilometers to enable a situational awareness to a high degree. In addition, the surveillance camera unit 10 may include a sighting optic (e.g., a commander sight) to also allow an optical inspection by a user.

As a result of this setup, in operation, the user will receive live images captured by the surveillance camera unit 10 that provide high resolution optical and/or infrared images. By using augmented reality, these live images can be overlaid by objects or symbols for detected objects in order to highlight the potential threat (for example a tank or a missile launch platform). Furthermore, the image processing ability of the image processing module 310 can be used to identify or confirm objects detected by the detection and countermeasure unit 20 so that the false alarm rate can be reduced by relying on the high-resolution image results provided by the surveillance camera unit 10.

Figure 2:
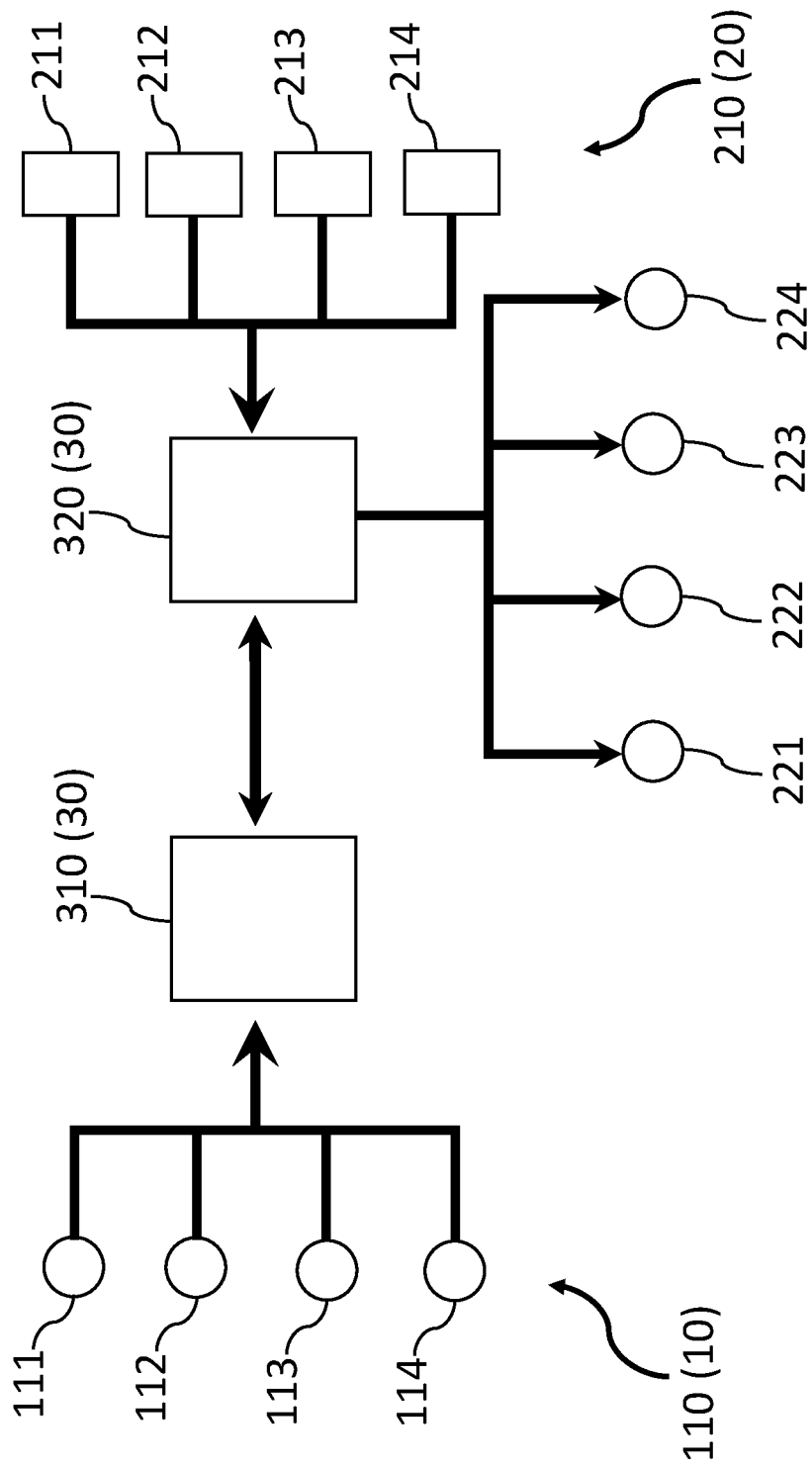
FIG. 2 depicts further details of the active protection system according to embodiments.

FIG. 2 depicts further details of the active protection system according to embodiments. The surveillance camera unit 10 includes four camera modules 110, a first camera module 111, a second camera module 112, a third camera module 113, and a fourth camera module 114, each of which can be arranged to capture images in a different direction so that a 360° permanent observation is made possible. In particular, each of the camera modules 111, 112, . . . is able to provide the day- and nightlight observations, for which infrared cameras/sensors may be installed. For this, each of the camera module(s) 110 may include different components, e.g., one camera for the visual spectral range (VIS) and others to cover different spectral ranges in the infrared such as near infrared, NIR, short wave infrared, SWIR, mid infrared, MIR, long wave infrared, LWIR.

Therefore, according the embodiments, the surveillance camera unit 10 provides a multispectral coverage of a surrounding by using the multiple camera modules 110 that are able to capture images in an all-round view. The camera modules 110 typically have a high pixel resolution with a high frame rate, so that even at distances of 300 m or more than 500 m humans can be detected by object recognition processes with a confidence level of more than 90%.

The central control unit 30 includes the image processing module 310 and the control module 320. The image processing module 310 provides, in particular, image processing and may be configured as a control and command system (C2 system) to employ human, physical, and information resources to solve problems and accomplish (military) missions. The control module 320 may be configured as a central unit for controlling and processing the results received by the detection and countermeasure units 20.

In this embodiment, the countermeasure unit 20 includes four sensors, a first sensor 211, a second sensor 212, a third sensor 213 and a fourth sensor 214, which are able to provide, for example, a permanent 360° laser warning and/or ultraviolet (UV) detection. Again, each of the sensors can be directed into a different direction so that an all-round monitoring is possible. Each of the sensors may include different kinds of sensor elements, for the detection of laser light irradiated by a laser guided missile or other weapons. UV-detectors and/or IR-detectors may detect radiation emitted upon a launch of a missile or of gunfire.

The detection and countermeasure unit 20 further includes, for example, four countermeasure devices 221, 222, . . . . The countermeasure devices 221, 222, . . . include, for example, a first vehicle hard-kill countermeasure 221 (e.g., missile launch pad), a second vehicle hard-kill countermeasure 222 (e.g., enable gunfire), a first soft-kill countermeasure 223 (e.g., a laser jammer) and a second soft-kill countermeasure 224 (e.g., a smoke dispenser). The countermeasure devices 221, 222, . . . are controlled by the control module 320 to attack a confirmed threat detected by the sensors 211, 212, . . . .

Figure 3:
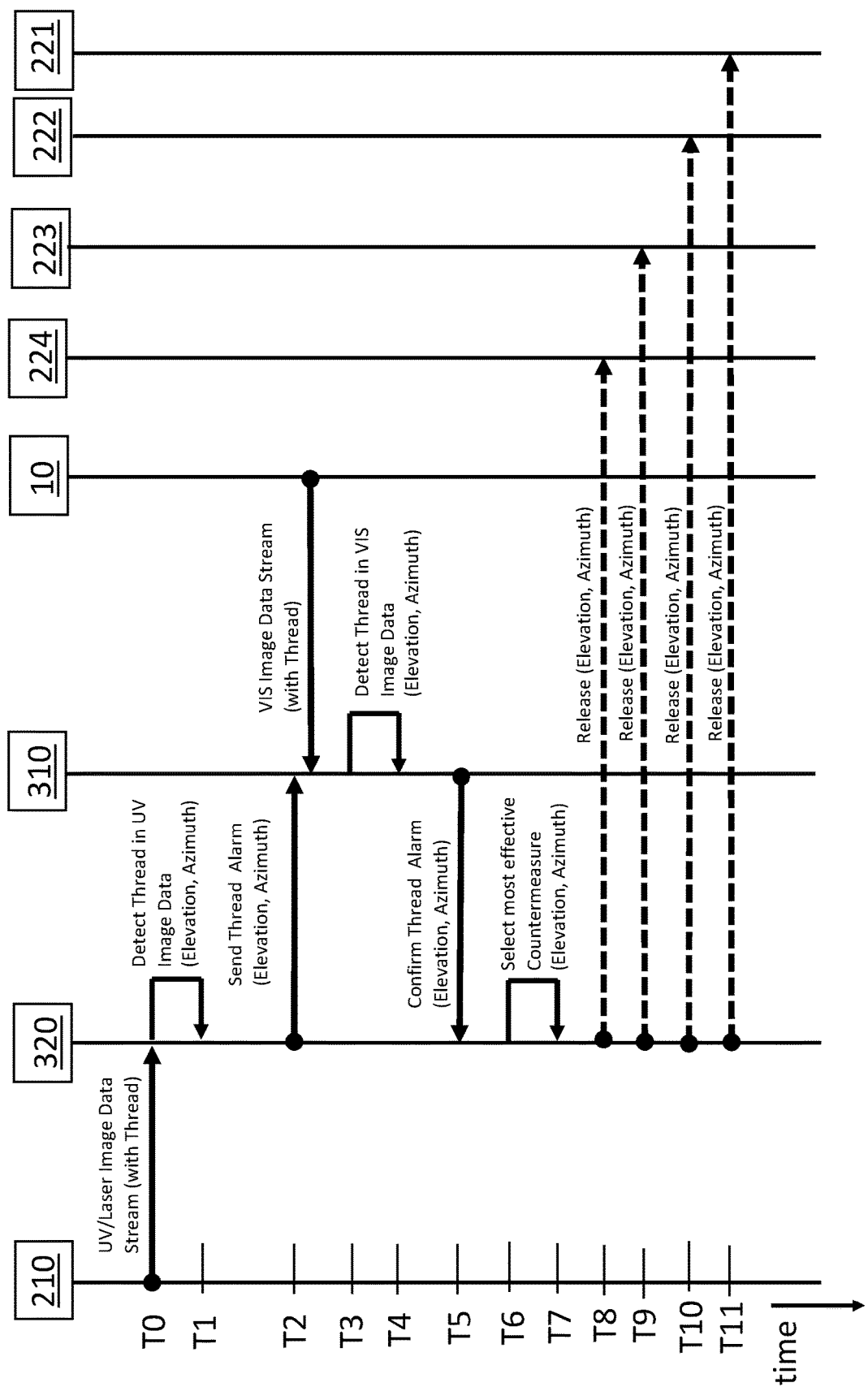
FIG. 3 illustrates an exemplary attack scenario and the response by the active protection system according to embodiments.

FIG. 3 illustrates an exemplary attack scenario and the response of the active protection system according to embodiments. For example, at an initial time T0, a sensor 210 of the detection and countermeasure unit 20 captures an image of a UV source or a laser irradiation that may indicate a potential threat. This image is sent to the control module 320. Between the initial time T0 and a first time T1, the control module 320 processes the image, and where the result indicate a potential threat the elevation and azimuth for the potential threat will be determined.

At a second time T2, the control module 320 sends the potential threat as an alarm signal together with the determined elevation and azimuth to the image processing unit 310. In response to the received image, the image processing unit 310 may capture another image (visual or IR) of the region where the potential threat was detected. Alternatively, the image processing unit 310 may inspect a previously captured image, if this image has not been captured before time T0 (e.g., if images are continuously captured).

Between a third time T3 and a fourth time T4, the image processing module may perform a detection of the potential threat in the captured image data—in particular at the elevation and azimuth as forwarded by the control module 320. If this detection confirms the potential threat detected by the control module 320, the image processing module 310 sends, at a fifth time T5, a confirmation of the threat alarm to the control module 320, optionally together with the confirmed elevation and azimuth. Again, a resolution of at least one camera of the camera unit 10 for the direction with the elevation and azimuth can be increased to improve the detectability.

Between a sixth time T6 and a seventh time T7, the control module 320 selects a countermeasure, which—based on predetermined criteria—are regarded as most efficient to attack the confirmed threat at the elevation and azimuth. Finally, the control module 320 may trigger or release the selected countermeasure at times T8 . . . T11. For example, the control module 320 may control, at an eighth time T8, the fourth countermeasure device 224; at a ninth time T9, the third countermeasure device 223; at a tenth time T10, the second countermeasure device 222; or at an eleventh time T11, the first countermeasure device 221.

It is apparent that not all countermeasures have to be released. Optionally, only one or some of the countermeasures are released at the same time or at different times, depending on the particular situation. During releasing the countermeasure, the control module 320 sends a corresponding signal together with the confirmed elevation and azimuth to the respective countermeasure device. Furthermore, the release of countermeasures may or may not be subject of a confirmation by a user.

Therefore, according to embodiments, images captured by the camera modules 110 are used to enable a confirmation of potential threats, such as missiles, laser guided weapons, and/or hostile file threats. As described, images are captured in the direction reported by the detection and countermeasure unit 20 as angle of arrival, wherein a sufficient radius/angular range is considered as region of interest. The confirmation is based on the available image processing ability of the surveillance system 10, 320. Due to the high resolution of the camera module(s) 110, the confirmation may provide a better resolution of the angle of arrival than the result provided by the detection and countermeasure unit 20.

Figure 4:
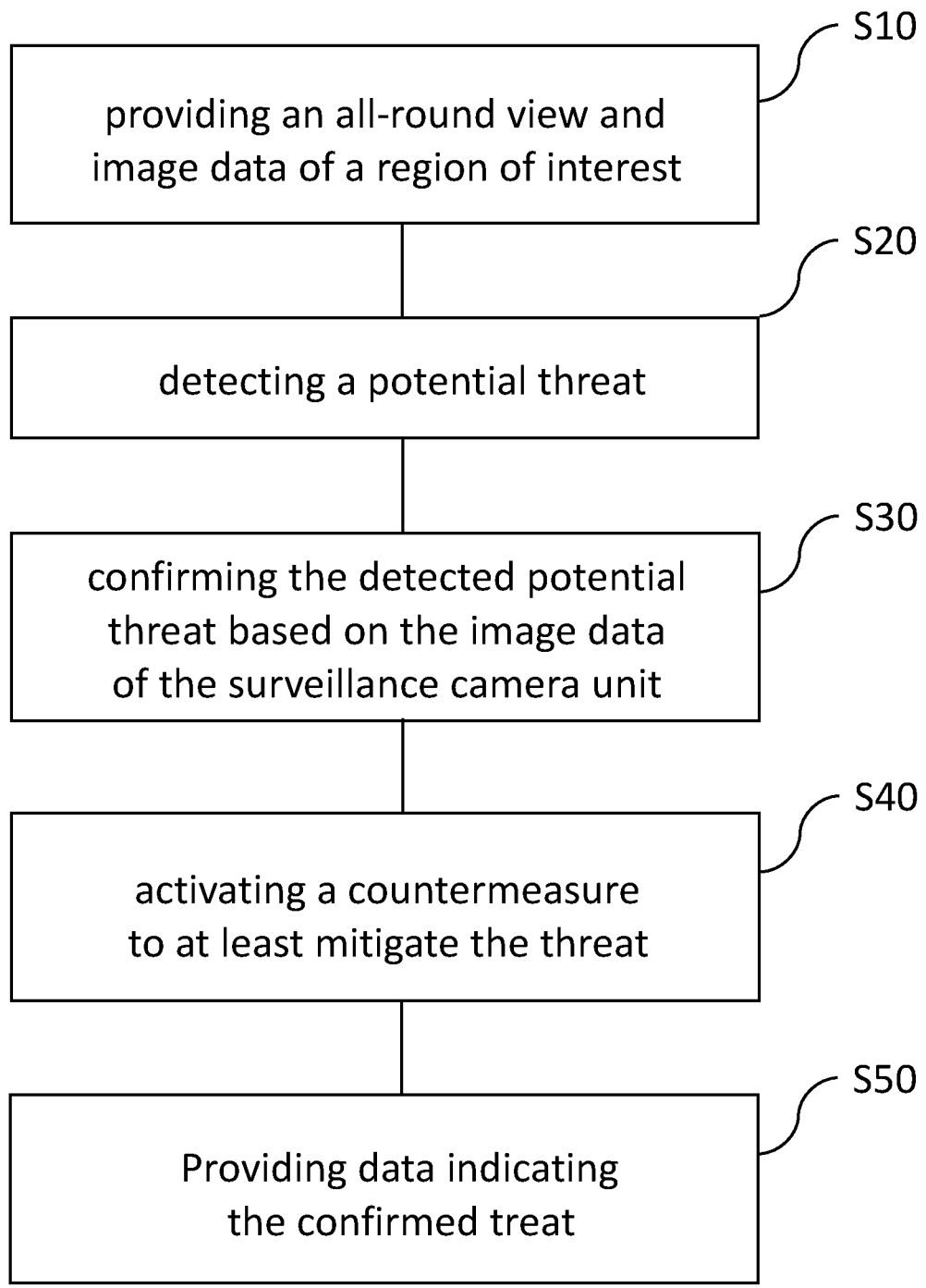
FIG. 4 shows a schematic flow chart for a method for operating an active protection system according to embodiments.

FIG. 4 shows a schematic flow chart for a method for operating an active protection system according to embodiments. The method includes:
 providing S10, by a surveillance camera unit 10, an all-round view and image data of a region of interest;
 detecting S20, by a detection and countermeasure unit 20, a potential threat;
 confirming S30, by a central processing unit 30, the detected potential threat based on the image data of the surveillance camera unit 10;
 activating S40, upon a confirmation, a countermeasure suitable to at least mitigate the threat; and
 providing S50 data indicating the confirmed threat.

According to further embodiments, all steps described with FIG. 3 can be implemented as further optional method steps.

According to further embodiments the active protection system uses the platform interoperability features (e.g., using various interfaces of the units 10, 20, 30) instead of having its own solution.

Embodiment provide the following advantages:

A particular advantage of embodiments relies on the shared hardware used by the surveillance system 10, 310 and countermeasure system 20, 320. Accordingly, a central computer (the central processing unit 30) and a common human machine interface 40, such as displays 410 and command and control inputs 420, can be shared. This integration may be achieved by accommodating the components in a common housing. Furthermore, the directable laser and/or light-emitting diode-based countermeasures 223 can be integrated into a commander sight to share its unique integration location. It is further possible that the optical part can be shared too: the cameras may be used as fine tracking sensors, range finding detectors might be used commonly as well.

The active protection system can thus be designed with low SWaP (SWaP=size, weight and power) because a high system integration is made possible by commonly using hardware and/or software modules. It provides more functionalities than the sum of the functions of each individual system.

For example, the commander sight may already include a laser range finder (LRF) and a wavelength of 1.5 µm. Thus, a laser-based countermeasure using a laser range finder at wavelength of about 2.1 µm can be integrated into the commander sight by sharing the laser system for both purposes. Such a laser cannot be detected or localized by standard laser warning systems.

According to embodiments, warning sensors, such as missiles warner, laser warner, radar warner, and/or hostile fire indicator provide threat alerts to the central processing unit 30 of the APS. These alerts offer general and/or specific threat information and the related angle of arrival (AoA). The threat information and the AoA are used:

to provide sufficient threat information to the crew, to select and activate an appropriate countermeasure into the required direction within the requested time, to provide the information to co-operative platforms that are located in the very vicinity and eventually threatened by the same attack or higher battle management systems.

Embodiments of the APS have very effective warning sensors providing a very high declaration rate in order to oversee a potential threat. At the same time the false alarm rate is very low in order to keep the crew workload low, not to waste consumable countermeasures, not to highlight the vehicle's own position by activating countermeasures, and not to block consumables that do not run out of countermeasure. However, the conventional active protection systems still have a high false alarm rate.

Both requirements, a very high declaration rate and a very low false alarm rate, are realized, according to embodiments, by using a confirmation that provides further threat information in order to support threat classification or identification and a better AoA estimate for a more targeted countermeasure activation.

Embodiments provide the following further benefits:

The surveillance camera unit 10 is able to provide a passive confirmation of any kind of threats by performing image processing into the direction of the threat by considering a region of interest (ROI) around the angle of arrival with a sufficient radius of the viewing circle, i.e., an angular region of ±2° or ±5° or ±10° or ±20° (lasers may use a higher angular region). The result is a confirmation with ideally more threat information and with a more accurate AoA estimation.

The active protection system shares common hardware, such as the central computer, in order to reduce latency and to provide a SWaP optimized system architecture.

The surveillance and the countermeasure units 10, 20 share the HMI, i.e., the display and the command and control system and thus offer a coordinated presentation of information to keep the workload of the crew low.

The platform interoperability functions of the surveillance and C2 system are utilized.

Laser- or LED-based soft-kill countermeasures can be integrated into the commander view (e.g., surveillance camera unit 10) to enhance the SWaP architecture of the overall system.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e., a particular feature descripted in one embodiment may also be realized in other embodiments. Such combinations are covered by the disclosure herein unless it is stated that a specific combination is not intended.

LIST OF REFERENCE SIGNS

10 surveillance camera unit
20 detection and countermeasure unit
30 central processing unit
40 human machine interface
110, 111, . . . camera modules
210, 211, . . . one or more sensors
220, 221, . . . one or more countermeasure devices
310 image processing module
320 control module
410 display device
420 inputs

The invention claimed is:

1. An active protection system comprising:
   a surveillance camera unit configured to provide an all-around view and image data of a region of interest;
   a detection and countermeasure unit configured to detect a potential threat and, upon a confirmation of the potential threat as a confirmed threat, to activate a countermeasure suitable to at least mitigate the confirmed potential threat; and
   a central processing unit configured to confirm the detected potential threat based on the image data of the surveillance camera unit and to provide data indicating the confirmed threat;
   a human-machine interface (HMI) including a display device and inputs to control the surveillance camera unit and the detection and countermeasure unit, wherein the HMI represents a common interface to visualize both images obtained from the surveillance camera system and objects detected by the detection and countermeasure unit,
   wherein the central processing unit and the HMI with the display are shared hardware of the surveillance camera unit and the detection and countermeasure unit,
   wherein the central processing unit and the HMI are accommodated within a common housing, and
   wherein the detection and countermeasure unit includes one or more countermeasure devices, and wherein the one or more countermeasure devices include, as a countermeasure, at least one of the following: a laser dazzler and a smoke dispenser.

2. The system of claim 1, wherein the central processing unit includes an image processing module configured to provide at least one of the following:
   object recognition for identifying objects in images provided by the surveillance camera unit, and
   synthetic image overlaying of images of the region of interest together with symbols for identified objects as an augmented reality representation.

3. The system of claim 2,
   wherein the display device to displays images of the region of interest together with the graphical symbols for identified objects as an augmented reality superimposed image.

4. The system of claim 2, wherein the central processing unit includes a control module configured to control the detection and countermeasure unit, the control module being configured for at least one of the following:
   to provide a threat information associated with the detected potential threat,
   to select and/or to activate an appropriate countermeasure, and
   to provide information to other platforms in a vicinity of the active protection system.

5. The system of claim 4, wherein the detection and countermeasure unit includes one or more sensors,
   wherein the one or more sensors include at least one of the following: a missile warner, a laser warner, a radar warner, a hostile fire indicator, a radiation sensor for at least an ultraviolet spectral range, and a tracking sensor configured to track a trajectory of a flying object or to capture changes in time for the detected threat.

6. The system of claim 1, wherein the surveillance camera unit includes four camera modules configured to provide a 360° view, each of the four camera modules being configured to cover at least one of the following spectral ranges:
visual range (VIS),
near infrared (NIR),
short wave infrared (SWIR),
mid infrared (MIR), and
long wave infrared (LWIR).

7. The system of claim 2, wherein the image processing module and the control module are integrated into one unit sharing common hardware.

8. The system of claim 5, wherein the central processing unit is configured to:
receive, by the control module, sensor data from the one or more sensors,
detect, by the control module, the potential threat in the sensor data,
determine, by the control module, an elevation and azimuth for the detected potential threat,
send a threat alarm, including the determined elevation and azimuth, to the image processing module,
receive, by the image processing module, image data from the surveillance camera unit for a region around the determined elevation and azimuth of the potential threat,
detect, by the image processing module, the threat in the received image data and, based thereon, to send a confirmation of the threat to the control module with a higher resolution for an angular region of arrival of the potential threat than in other directions,
select, by the control module, at least one countermeasure,
activate, by the control module, the selected at least one countermeasure automatically or upon a manual activation.

9. The system of claim 1, wherein the surveillance camera unit includes further optical counter measure devices.

10. A method for operating an active protection system comprising:
providing, by a surveillance camera unit, an all-around view and image data of a region of interest;
detecting, by a detection and countermeasure unit, a potential threat;
confirming, by a central processing unit, the detected potential threat based on the image data of the surveillance camera unit;
activating, upon a confirmation of the detected potential threat as a confirmed threat, a countermeasure suitable to at least mitigate the detected potential threat; and
providing data indicating the confirmed threat,
wherein the method further comprises visualizing on a display of a human-machine interface (HMI) both images obtained form the surveillance camera unit and objects detected by the detection and countermeasures unit, wherein the HMI also includes inputs to control the surveillance camera unit and the detection and countermeasure unit, and wherein the central processing unit and the HMI with the display are shared hardware of the surveillance camera unit and the detection and countermeasure unit, wherein the central processing unit and the HMI are accommodated within a common housing
wherein at least one of the following is activated as the countermeasure
a laser dazzler,
a smoke dispenser, and
a vehicle hard-kill device.

11. An active protection system comprising:
a surveillance camera unit configured to provide an all-around view and image data of a region of interest;
a detection and countermeasure unit configured to detect a potential threat and, upon a confirmation of the potential threat as a confirmed threat, to activate a countermeasure suitable to at least mitigate the confirmed potential threat; and
a central processing unit configured to confirm the detected potential threat based on the image data of the surveillance camera unit and to provide data indicating the confirmed threat; and
a human-machine interface (HMI) including a display device and inputs to control the surveillance camera unit and the detection and countermeasure unit, wherein the HMI represents a common interface to visualize both images obtained from the surveillance camera system and objects detected by the detection and countermeasure unit,
wherein the central processing unit and the HMI with the display are shared hardware of the surveillance camera unit and the detection and countermeasure unit, and wherein the central processing unit and the HMI are accommodated within a common housing
wherein the detection and countermeasure unit includes one or more countermeasure devices, and wherein the one or more countermeasure devices include, as a countermeasure, a vehicle hard-kill device.

* * * * *